(12) United States Patent
Macken et al.

(10) Patent No.: US 9,978,412 B1
(45) Date of Patent: May 22, 2018

(54) TRANSPARENT THERMOCOUPLE FOR HEAT-ASSISTED MAGNETIC RECORDING DEVICE

(71) Applicant: Seagate Technology LLC, Cupertino, CA (US)

(72) Inventors: Declan Macken, Eden Prairie, MN (US); Patrick Carl Fletcher, Minnetonka, MN (US); Song Chen, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/337,308

(22) Filed: Oct. 28, 2016

Related U.S. Application Data

(60) Provisional application No. 62/252,015, filed on Nov. 6, 2015, provisional application No. 62/287,607, filed on Jan. 27, 2016, provisional application No. 62/379,431, filed on Aug. 25, 2016.

(51) Int. Cl.
| | | |
|---|---|---|
| *G11B 11/00* | (2006.01) | |
| *G11B 5/60* | (2006.01) | |
| *G11B 5/31* | (2006.01) | |
| G11B 5/00 | (2006.01) | |
| G11B 7/1387 | (2012.01) | |
| G11B 11/105 | (2006.01) | |

(52) U.S. Cl.
CPC ............ *G11B 5/6088* (2013.01); *G11B 5/314* (2013.01); *G11B 7/1387* (2013.01); *G11B 11/10543* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 3,232,886 | A | 2/1966 | Hoffman |
| 4,969,956 | A | 11/1990 | Kreider et al. |
| 5,610,572 | A | 3/1997 | Yajima |
| 6,433,310 | B1 | 8/2002 | Wickramasinghe et al. |
| 6,433,957 | B1 | 8/2002 | Rudd et al. |
| 7,731,337 | B2 | 6/2010 | Kang et al. |
| 8,085,513 | B2 | 12/2011 | Sasaki |
| 8,098,464 | B2 | 1/2012 | Shimazawa |
| 8,339,740 | B2 | 12/2012 | Zou et al. |
| 9,142,229 | B2 | 9/2015 | Kautzky et al. |

(Continued)

OTHER PUBLICATIONS

Gupta et al., "Optoelectrical properties ZnO and W-doped $In_2O_3$ multilayer films grown by pulsed laser deposition", Journal of Optoelectronics and Biomedical Materials, vol. 1, Issue 2, Jun. 2009, p. 209-214.

(Continued)

*Primary Examiner* — Tan X Dinh
(74) *Attorney, Agent, or Firm* — Hollingsworth Davis, LLC

(57) ABSTRACT

A slider is configured for heat-assisted magnetic recording and comprises an NFT and a transparent thermocouple configured to produce a signal indicative of temperature at the NFT. A detector can be coupled to the thermocouple and configured to detect one or both of spacing changes and contact between the slider and a magnetic recording medium.

22 Claims, 15 Drawing Sheets

(56) References Cited

U.S. PATENT DOCUMENTS

| | | | |
|---|---|---|---|
| 9,595,288 B1* | 3/2017 | Chu | G11B 7/1267 369/13.33 |
| 2002/0101812 A1 | 8/2002 | Wickramasinghe et al. | |
| 2006/0030844 A1* | 2/2006 | Knight | A61B 18/1492 606/41 |
| 2009/0040645 A1* | 2/2009 | Shimazawa | G11B 5/02 369/13.33 |
| 2009/0128965 A1 | 5/2009 | Mizuno et al. | |
| 2009/0251139 A1 | 10/2009 | Warin et al. | |
| 2010/0074616 A1 | 3/2010 | Kewitsch | |
| 2011/0205863 A1 | 8/2011 | Zhao et al. | |
| 2011/0272575 A1 | 11/2011 | Kim et al. | |
| 2011/0299367 A1 | 12/2011 | Naniwa et al. | |
| 2012/0051196 A1 | 3/2012 | Grobis et al. | |
| 2012/0307605 A1* | 12/2012 | Zhang | G11B 5/455 369/13.32 |
| 2012/0314549 A1 | 12/2012 | Lee et al. | |
| 2013/0265863 A1* | 10/2013 | Zhang | G11B 5/455 369/13.33 |
| 2013/0286802 A1* | 10/2013 | Kiely | G11B 13/04 369/13.33 |
| 2013/0286805 A1 | 10/2013 | Macken et al. | |
| 2013/0286807 A1 | 10/2013 | Gao et al. | |
| 2014/0269238 A1* | 9/2014 | Kautzky | G11B 5/3133 369/13.33 |
| 2015/0279430 A1* | 10/2015 | Trantham | G11B 5/314 369/13.26 |
| 2016/0104514 A1* | 4/2016 | Burnett | G11B 5/6088 369/13.33 |

OTHER PUBLICATIONS

Minami, "Transparent conducting oxide semiconductors for transparent electrodes", Semicond. Sci. Technol., vol. 20, 2005, p. 35-44.

Wu et al., "Characterization of aluminum-doped zinc oxide thin films by RF magnetron sputtering at different substrate temperature and sputtering power", Journal of Materials Science: Materials in Electronics, vol. 24, Issue 1, Jan. 2013, pp. 166-171.

* cited by examiner k = 0

Tmax = 341 K k = 0.02

Tmax = 347 K k = 0.05

Tmax = 352 K

TRANSPARENT THERMOCOUPLE FOR HEAT-ASSISTED MAGNETIC RECORDING DEVICE

RELATED PATENT DOCUMENTS

This application claims the benefit of Provisional Patent Application Ser. Nos. 62/252,015 filed on Nov. 6, 2015; 62/287,607 filed on Jan. 27, 2016; and 62/379,431 filed on Aug. 25, 2016, to which priority is claimed pursuant to 35 U.S.C. § 119(e), and which are incorporated herein by reference in their entireties.

SUMMARY

Embodiments of the disclosure are directed to an apparatus comprising a slider configured for heat-assisted magnetic recording. A near-field transducer (NFT) is situated at the slider. A transparent thermocouple is situated at the slider and configured to produce a signal indicative of temperature at the NFT.

Other embodiments are directed to an apparatus comprising a slider configured for heat-assisted magnetic recording, an NFT at the slider, and a transparent thermocouple at the slider and configured to produce a signal indicative of temperature at the NFT. A detector is coupled to the thermocouple. The detector is configured to detect one or both of spacing changes and contact between the slider and a magnetic recording medium.

Some embodiments are directed to a method providing relative movement between a magnetic recording medium and a slider configured for heat-assisted magnetic recording. The method also comprises sensing a temperature at a near-field transducer of the slider using a transparent thermocouple. The temperature can be a relative temperature or an absolute temperature.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
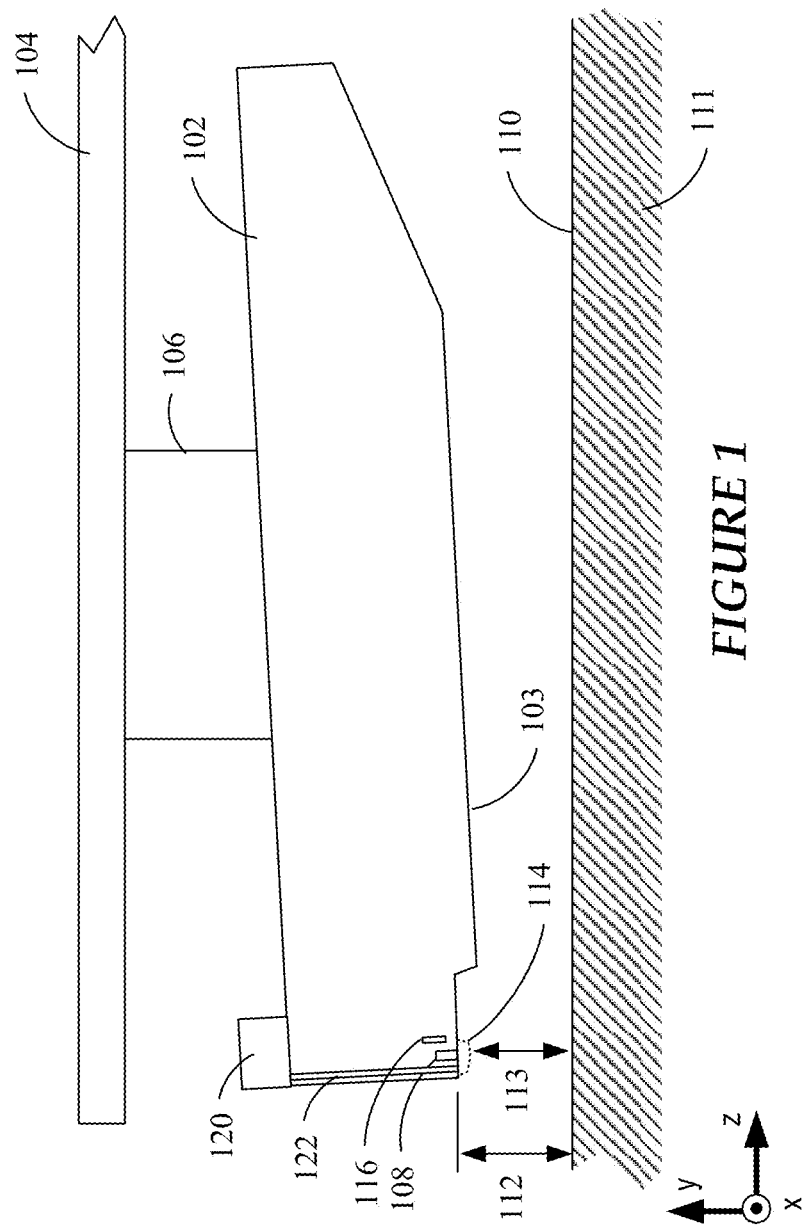
FIG. 1 is a schematic representation of a slider configured for heat-assisted magnetic recording (HAMR) in which the various embodiments disclosed herein may be implemented.

The present disclosure generally relates to setting clearance, head-to-medium spacing/contact detection, and laser power monitoring in data storage devices that employ heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

Generally, recording heads may utilize heaters for fine control of head-to media spacing. The heaters heat a portion of the recording head that faces a recording medium. The heating causes a local protrusion due to thermal expansion of the material. Thermal protrusion can be finely controlled to maintain a desired clearance between a slider (which supports one or more writers and one or more readers) and the recording medium. The regions subject to thermal protrusion control typically include a region proximate the writer and, in some implementations, a region proximate the reader(s). Each of these regions, when thermally activated, becomes a so-called close point relative to the recording medium.

In order to establish an appropriate or optimal dynamic clearance for the slider, it is desirable to measure fly height at the close point or points, since these regions are closest to the recording medium when thermally actuated. Further, while conventional sliders may be allowed to contact the recording medium under some conditions, a HAMR device may be damaged if such contact occurs while recording. This can make the estimation and control of head-to-medium spacing (e.g., dynamic clearance) and setting clearance more difficult in a HAMR recording head. The introduction of optical components in HAMR sliders complicates head-to-medium spacing and contact detection due to the physical presence and heat generated by the optical components.

For example, in HAMR sliders, the location of a fly height sensor is restricted to areas outside of the optical path in order to ensure light delivery to the NFT is not degraded by the presence of the fly height sensor. Ideally, any sensor designed for head-disk interaction would be at the close point of the recording transducer, which for current HAMR transducers is preferably at the NFT and write pole. However, due to the requirement that the fly height sensor must not compromise light delivery, fly height sensors are typically spaced more than 1 μm from the NFT and write pole.

A HAMR drive generally uses a laser diode to heat the recording medium to aid in the recording process. The laser diode generates heat and is also heated by other components (writer, reader, heater elements) in the slider. During write operation, for example, laser diode heating can vary the junction temperature of the laser diode, causing a shift in laser emission wavelength, leading to a change of optical feedback from the optical path in the slider to the cavity of the laser diode, a phenomenon which leads to mode hopping/power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another. Large transition shifts in a block of data may not be recoverable by channel decoding, resulting in error bits.

Monitoring of laser power is important to ensure proper operation of the laser diode and to avoid instabilities such as mode hopping. Conventional laser power monitoring involves use of an external photodiode situated on a submount that also supports the laser diode. The photodiode senses optical power output of the laser diode, and can be used to determine if the laser performance is sufficiently stable to ensure adequate writing performance. However, future integrated HAMR recording transducers will not be able to include an external photodiode due to reduced submount dimensions.

Adequate head-medium contact detection response remains critical to hard drive development. For HAMR hard drives, it is also critical to detect small fluctuations in laser output optical power delivered to the NFT while minimizing any light delivery losses. Typically, an electrical element such as an internal laser power monitor (e.g., photodiode) would require extra, dedicated electrical bond pads. Since additional bond pads add cost and complexity to the head gimbal assembly, it is desirable to provide both sensing of head-medium interactions and laser output optical power without the need for additional bond pads.

Referring now to FIG. 1, a block diagram shows a side view of a recording head arrangement comprising a slider 102 according to a representative embodiment. The slider 102 may be used in a magnetic data storage device, e.g., a hard disk drive. The slider 102 may also be referred to herein as a recording head, a write head, or a read/write head. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. The slider 102 is configured as a HAMR recording head, which includes a laser 120 (or other energy source) and a waveguide 122. The waveguide 122 delivers light from the laser 120 to components near the read/write transducers 108.

When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface 103 (also referred to herein as a "media-facing surface") of the slider 102 when the recording medium 111 is rotating. It is desirable to maintain a predetermined slider flying height 112 over a range of disk rotational speeds during both reading and writing operations to ensure consistent performance. Region 114 is a "close point" of the slider 102, which is generally understood to be the closest spacing between the read/write transducers 108 and the magnetic recording medium 111, and generally defines the head-to-medium spacing 113. To account for both static and dynamic variations that may affect slider flying height 112, the slider 102 may be configured such that a region 114 of the slider 102 can be configurably adjusted during operation in order to finely adjust the head-to-medium spacing 113. This is shown in FIG. 1 by a dotted line that represents a change in geometry of the region 114. In this example, the geometry change may be induced, in whole or in part, by an increase or decrease in temperature of the region 114 via a heater 116.

Figure 2:
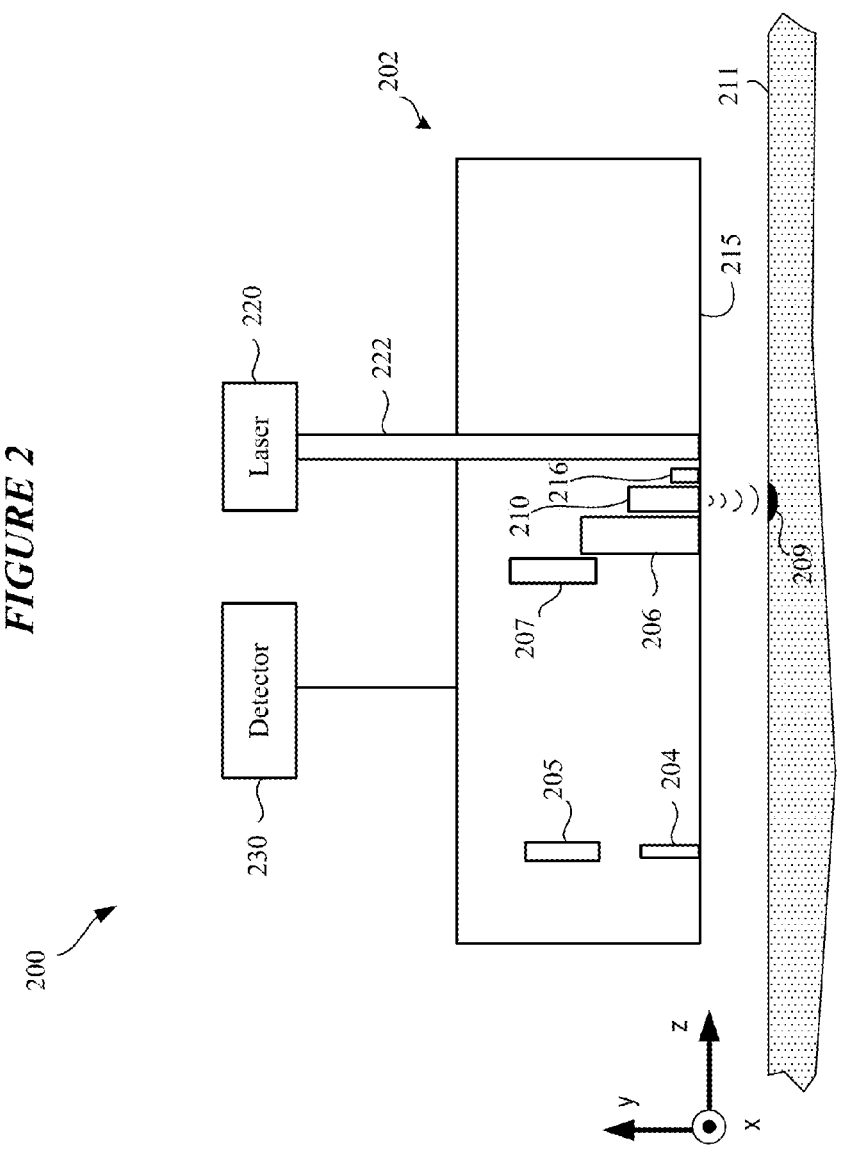
FIG. 2 shows a HAMR slider in accordance with various embodiments.

FIG. 2 shows a recording head arrangement 200 configured for heat-assisted magnetic recording in accordance with various embodiments. The recording head arrangement 200 includes a slider 202 positioned proximate a rotating magnetic medium 211. The slider 202 includes a reader 204 and a writer 206 proximate the ABS 215 for respectively reading and writing data from/to the magnetic medium 211. The writer 206 is located adjacent an NFT 210 which is optically coupled to a light source 220 (e.g., laser diode) via a waveguide 222. The light source 220 can be mounted externally, or integral, to the slider 202. The light source 220 energizes the NFT 210 via the waveguide 222. A transparent thermocouple 216, embodiments of which are described in detail hereinbelow, is shown situated proximate the NFT 210. A detector 230 is coupled to the slider 202 and, more particularly, to the transparent thermocouple 216. The transparent thermocouple 216 produces an open circuit voltage that can be used by the detector 230 for one or more of measuring relative or absolute temperature near or at the NFT 210, determining fly height and/or contact between the slider 202 and the recording medium 211 at a close point that includes the NFT 210, and monitoring output optical power of the laser 220.

In some embodiments, the transparent thermocouple 216 incorporates two dissimilar elements that form a junction, wherein each of the two elements is optically transparent. In other embodiments, one of two dissimilar elements that form a junction is optically transparent, while the other element is an existing component of the slider 202, such as the NFT 210. Because one of the elements is a pre-existing (non-transparent) component of the slider 202 and the other element is optically transparent, this configuration is considered a transparent thermocouple because no additional non-optically transparent element is being introduced into the slider 202. As such, both configurations are referred to herein as transparent thermocouples.

The transparent thermocouple 216 is preferably situated at a location of the slider 202 that is subject to laser-induced writer protrusion, which is described below with reference to FIG. 3. The writer 206 includes a corresponding heater 207, and the reader 204 includes a corresponding heater 205 according to various embodiments. The writer heater 207 can be powered to cause protrusion of the ABS 215 predominately in the ABS region at or proximate the writer 206, and the reader heater 205 can be powered to cause protrusion of the ABS 215 predominately in the ABS region at or proximate the reader 204. Power can be controllably delivered independently to the heaters 207 and 205 to adjust the fly height (e.g., clearance) of the slider 202 relative to the surface of the recording medium 211.

A HAMR device utilizes the types of optical devices described above to heat a magnetic recording media (e.g., hard disk) in order to overcome superparamagnetic effects that limit the areal data density of typical magnetic media. When writing with a HAMR device, electromagnetic energy is concentrated onto a small hot spot 209 over the track of the magnetic medium 211 where writing takes place, as shown in FIG. 2. The light from the source 220 propagates to the NFT 210, e.g., either directly from the source 220 or through the mode converter or by way of a focusing element. Other optical elements, such as couplers, mirrors, prisms, etc., may also be formed integral to the slider. As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 209 is on the order of 50 nm or less. Thus, the desired hot spot size is well below half the wavelength of the light. Optical focusers cannot be used to obtain the desired hot spot size, being diffraction limited at this scale. As a result, the NFT 210 is employed to create a hot spot 209 on the media.

The NFT 210 is a near-field optics device configured to generate local surface plasmon resonance at a designated (e.g., design) wavelength. The NFT 210 is generally formed from a thin film of plasmonic material (e.g., gold, silver, copper) on a substrate. In a HAMR slider 202, the NFT 210 is positioned proximate the write pole of the writer 206. The NFT 210 is aligned with the plane of the ABS 215 parallel to the read/write surface of the magnetic medium 211. The NFT 210 achieves surface plasmon resonance in response to the incident electromagnetic energy. The plasmons generated by this resonance are emitted from the NFT 210 towards the magnetic medium 211 where they are absorbed to create the hot spot 209. At resonance, a high electric field surrounds the NFT 210 due to the collective oscillations of electrons at the metal surface (e.g., substrate) of the magnetic medium 211. At least a portion of the electric field surrounding the NFT 210 gets absorbed by the magnetic medium 211, thereby raising the temperature of the spot 209 on the medium 211 as data is being recorded.

As was previously discussed, laser light produced by the laser 220 is coupled to the NFT 210 via the waveguide 222. The NFT 210, in response to the incident laser light, generates a high power density in a near-field region that is directed to the magnetic storage medium 211. This high power density in a near-field region of the NFT 210 causes an increase in local temperature of the medium 211, thereby reducing the coercivity of the magnetic material for writing or erasing information to/at the local region of the medium 211. A portion of the laser light energy communicated to the NFT 210 is absorbed and converted to heat within the slider 215. This heating results in thermal expansion of the ABS materials, protrusion at the ABS 215, and a change in both head-media clearance and head-media separation. In addition to the NFT 210, the slider 202 typically includes additional heat sources that can cause further thermal expansion and protrusion of the ABS 215. Such additional heat sources, when active, include one or more of the writer 206 (writer coil), writer heater 207, and reader heater 204.

Accurate determination of the clearance between the NFT 210 and the surface of the recording medium 211 at the operational write protrusion is a challenge due to the limited writer area that contacts the medium 211. Traditional temperature-based contact detection methods are not sufficient for detecting NFT-medium contact because conventional resistance thermometer elements, such as the resistive devices with a high thermal coefficient of resistance, are metallic and thus cannot be located close to the optical path due to parasitic light absorption. The spatial separation between the NFT 210 and the resistance thermometer prevents accurate determination of the temperature of the NFT.

Embodiments of the disclosure are directed to a technique for detecting HAMR writer contact locally and measuring the NFT temperature in situ by co-locating an optically-transparent thermal element with the NFT 210 and/or optical waveguide 222. Embodiments are directed to an optically-transparent thermocouple that can withstand high temperatures associated with NFT excitation (e.g., up to ~450° C.) and does not degrade the light path or optics within the slider (e.g., has no or only a negligible impact on the performance of the NFT 210). For example, embodiments of a transparent thermocouple can be positioned relative to the NFT 210 so that only a small increase (e.g., 5% or less) in the temperature at the peg region of the NFT 210 results, if at all. Embodiments are directed to a transparent thermocouple that can be implemented as a multi-purpose device for setting NFT/write pole clearance, monitoring laser power, and measuring NFT temperature. Some embodiments are directed to a transparent thermocouple that can provide absolute temperature measurements at the NFT.

Figure 3:
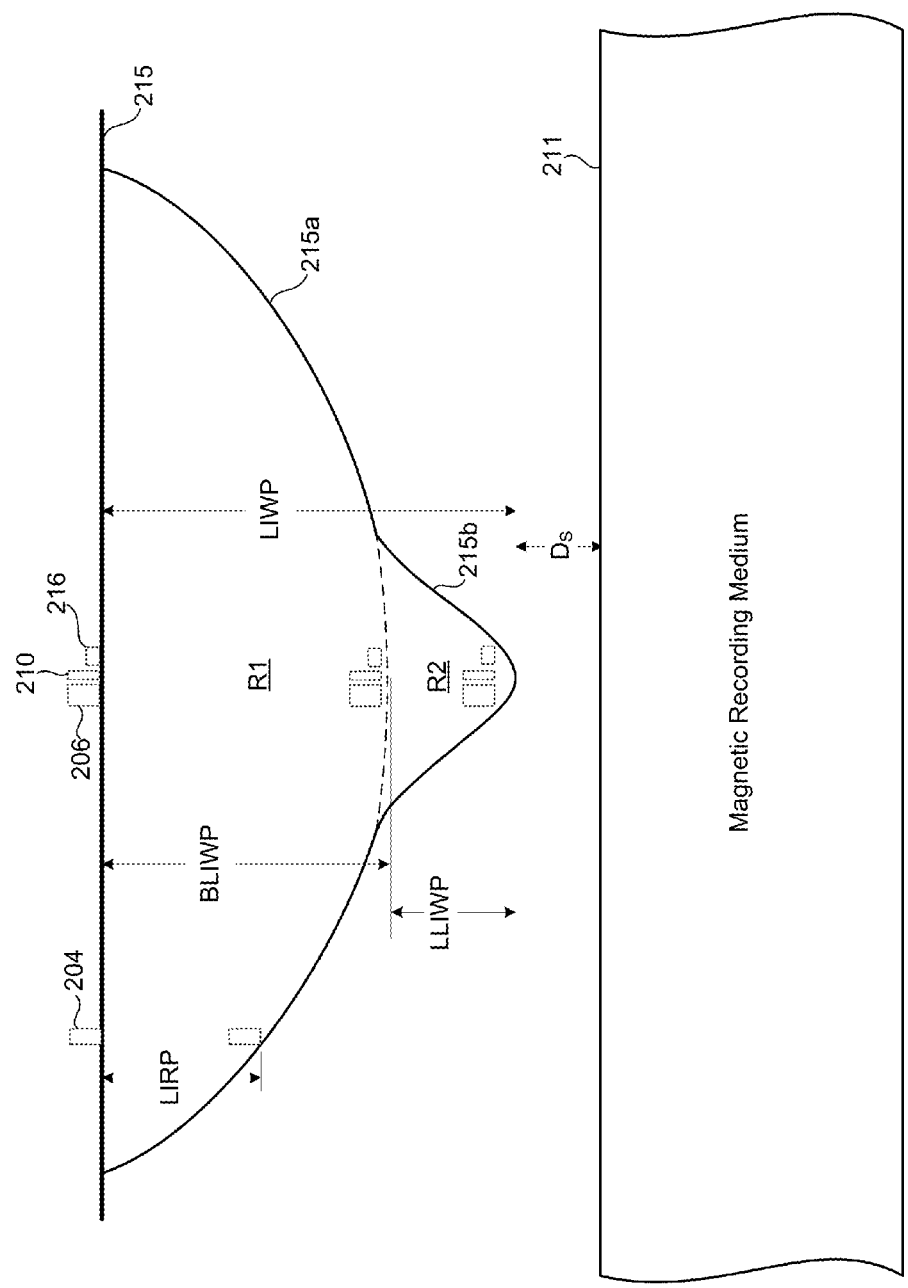
FIG. 3 is an exaggerated illustration of a laser-induced protrusion developed at an air bearing surface (ABS) of a HAMR slider in accordance with various embodiments.

FIG. 3 is an exaggerated illustration of a laser-induced protrusion developed at the ABS 215 of a HAMR slider 202 in accordance with various embodiments. More particularly, the protrusion of the slider ABS 215 shown in FIG. 3 is referred to as Laser-Induced Writer Protrusion (LIWP). As a shown in FIG. 3, the region of LIWP encompasses a writer 206, an NFT 210, and a transparent thermocouple 216 of the slider. LIWP represents the full excursion of the protrusion developed at the ABS 215 due to heating of the NFT 210 by excitation of the laser and other heat sources (e.g., the writer 206 and writer heater 207). It is noted that the reader 204 is also subject to displacement by the ABS protrusion resulting from excitation of the laser of the slider. Protrusion of the slider ABS 215 due to laser/NFT heating in the region that encompasses the reader 204 is referred to as Laser-Induced Reader Protrusion (LIRP). Because the reader 204 is situated away from the NFT 210/writer 206, allowing for dissipation of laser-induced heat, LIRP is not as pronounced as LIWP. It is noted that the features shown in FIG. 3 are not drawn to scale.

LIWP is understood to include two protrusion components. The first component of LIWP is a broad protrusion component, referred to herein as Broad Laser-Induced Writer Protrusion (BLIWP). As the term implies, a relatively broad region of the ABS 215 surrounding the writer 206 and NFT 210 expands to form a protruded region (volume) R1 in response to the heat generated by the NFT 210 and the writer 206 (and writer heater 207). The second component of LIWP is a local protrusion component, referred to herein as Local Laser-Induced Writer Protrusion (LLIWP). LLIWP is a small and narrow protrusion (relative to the BLIWP) that extends from the BLIWP in a direction towards the surface of the magnetic recording medium 211. As can be seen in FIG. 3, the BLIWP component encompasses a significantly larger volume (in region R1) of ABS material relative to that (in region R2) of the LLIWP component. Evaluation of experimental sliders has revealed that LIWP typically ranges between about 2 and 4 nm, while LLIWP typically ranges between about 1 to 2 nm (<2 nm).

An important function of a hard disk drive (HDD) is to accurately set the clearance between the slider and the surface of the magnetic storage medium of the HDD in order to maintain the written bit size, and thus maintain areal bit density. Toward this end, various techniques have been developed to set clearance that involve incrementally reducing fly height of the slider until contact is made between the slider and the recording medium. Once contact is made, an appropriate clearance is set such that slider is made to fly close to, but spaced apart from, the surface of the medium during operation. It can be appreciated that for HAMR sliders, it is important to account for LIWP in order to avoid detrimental contact between the slider and the medium. Conventional clearance techniques use a resistive sensor situated away from the NFT 210/writer 206. As was previously discussed, a resistive sensor cannot be located in the optical path due to parasitic light absorption, nor can a resistive sensor withstand the high temperatures associated with NFT excitation. Because of these constraints, conventional clearance sensors are positioned well away from the ABS region of greatest protrusion, thereby preventing localized sensing of operational write protrusion needed for highly accurate clearance, fly-height, and contact determinations.

Figure 4:
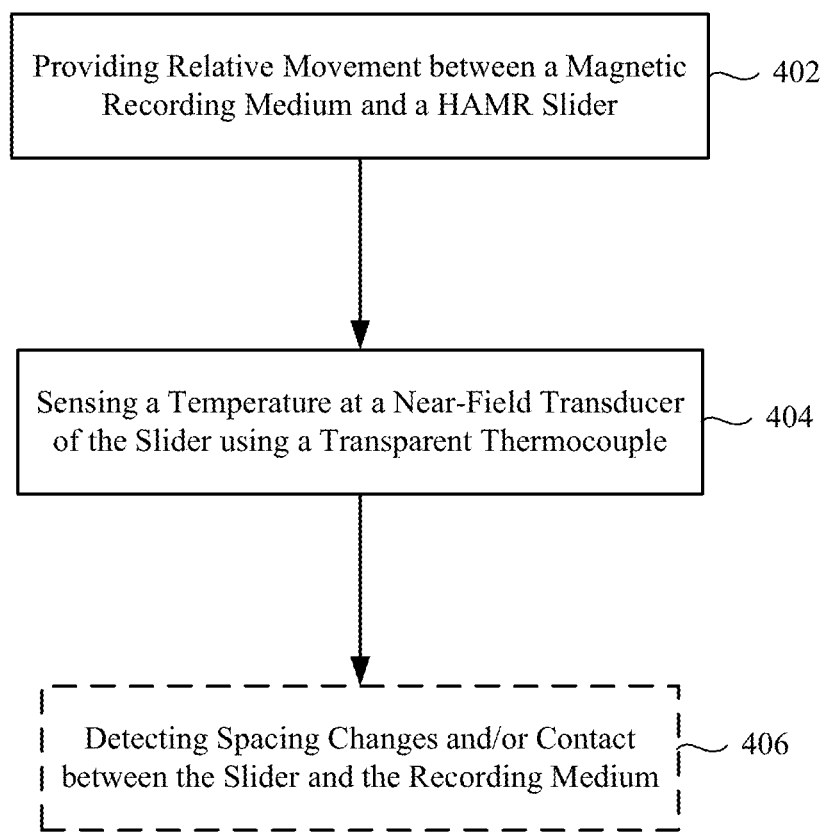
FIG. 4 illustrates various processes of a method for sensing temperature at a near-field transducer of a HAMR slider in accordance with various embodiments.

FIG. 4 illustrates various processes of a method for sensing temperature at a near-field transducer of a HAMR slider in accordance with various embodiments. The method shown in FIG. 4 involves providing 402 relative movement between a magnetic recording medium and a HAMR slider. The method also involves sensing 404 a temperature at a near-field transducer of the slider using a transparent thermocouple. The method may also involve detecting 406 spacing changes and/or contact between the slider and the recording medium using a signal produced by the transparent thermocouple.

Figure 5:
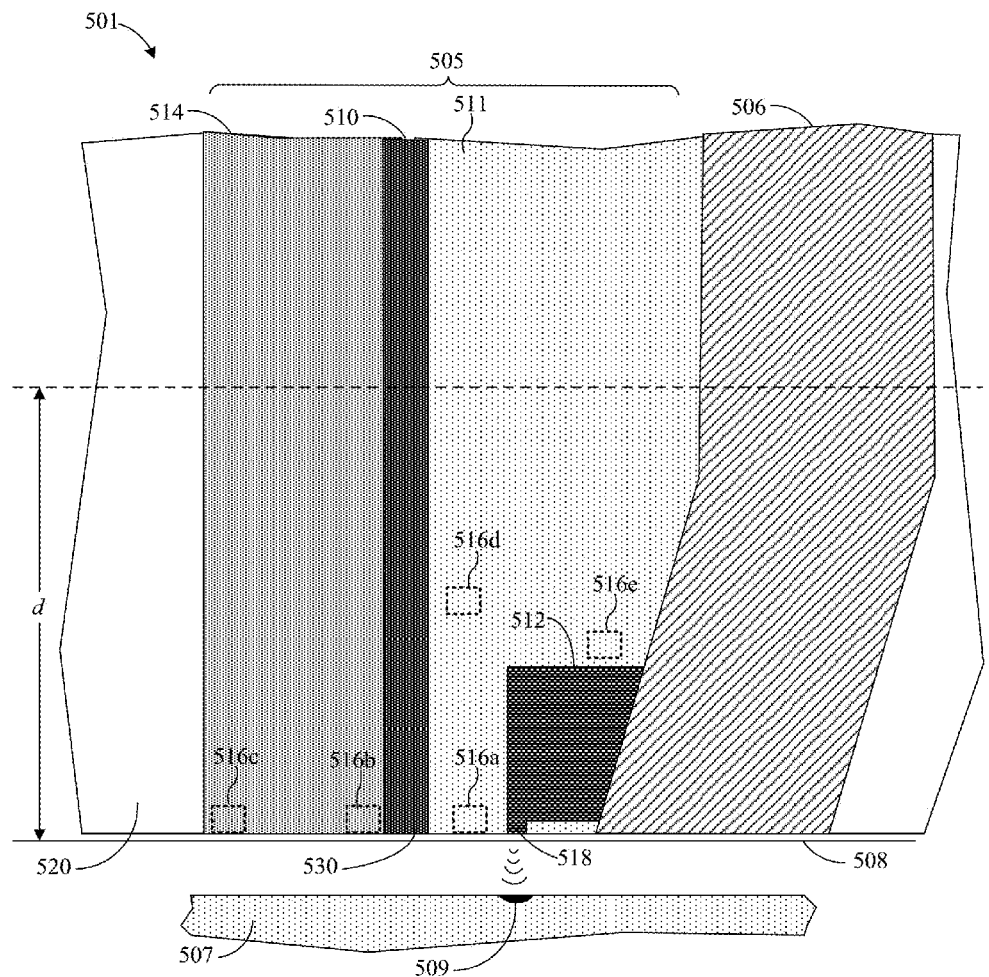
FIG. 5 is a cross-sectional view illustrating portions of a HAMR slider which includes a transparent thermocouple proximate a near-field transducer (NFT) according to various embodiments.

Turning now to FIG. 5, there is shown a cross-sectional view illustrating portions of a slider body 501 that include a near-field transducer 512 and a transparent thermocouple 516 according to a representative embodiment. In this view, the NFT 512 is shown proximate the ABS 508 of the slider body 501 and to a surface of magnetic recording medium 507, e.g., a magnetic disk. The NFT 512 shown in FIG. 5 is of an NTS (near-field transducer stadium style) design which includes an enlarged region having a sloped planar upper surface. It is noted that NFT 512 can be of a different design, such as a so-called lollipop or peg-only (e.g., nanorod) design, for example. A peg 518 extends from the lower portion enlarged region and terminates near or at the ABS 508. A waveguide 505 delivers electromagnetic energy from a laser diode (e.g., see laser 120 in FIG. 1) to the NFT 512, which directs the energy to create a small hot spot 509 on the recording medium 507. The waveguide 505 comprises a layer of core material 510 surrounded by cladding layers 511 and 514. A magnetic write pole 506 causes changes in magnetic flux near the media facing surface 508 in response to an applied current. Flux from the write pole 506 changes a magnetic orientation of the hot spot 509 as it moves past the write pole 506 in the downtrack direction.

FIG. 5 shows a transparent thermocouple 516 situated at different locations of the slider body 501. Transparent thermocouple 516a, for example, is situated at the ABS 508 within cladding layer 511 and proximate the peg 518 of the NFT 512. Transparent thermocouple 516b is situated at the ABS 508 within cladding layer 514 and adjacent the core layer 510. Transparent thermocouple 516c, by way of further example, is situated within the cladding layer 514 and spaced away from the core layer 510. Although it is generally desirable to position the transparent thermocouple 516 at or near the ABS 508, experiments have demonstrated that accurate slider-medium spacing determinations can be made using the transparent thermocouple 516 located away from the ABS 508. For example, transparent thermocouple 516d can be located in the cladding layer 511 adjacent the core layer 510 and spaced away from the ABS 508 by a distance, d, of up to about 1.5 µm. In the illustration shown in FIG. 5, transparent thermocouple 516d is spaced away from the ABS 508 by a distance of about 0.8 µm. Transparent thermocouple 516e is situated within the cladding layer 511 directly above the enlarged region of the NFT 512. It is understood that the transparent thermocouple 516 can be located at a variety of positions within the slider body 501, with a preference that it be located closer to, rather than further away from, the NFT 512. According to some embodiments, the transparent thermocouple 516 can have a cross-sectional area ranging from about 10 $nm^2$ to 10 $\mu m^2$. For example, the transparent thermocouple 516 can be located at the ABS 508 (see, e.g., transparent thermocouple 516a) and have a cross-sectional area of about 2500 $nm^2$ (e.g., 50 nm×50 nm). As another example, the transparent thermocouple 516 can be located above the enlarged region of the NFT 512 (see, e.g., transparent thermocouple 516e) and have a cross-sectional area of about 5000 $nm^2$ (e.g., 200 nm×25 nm).

Figure 6A:
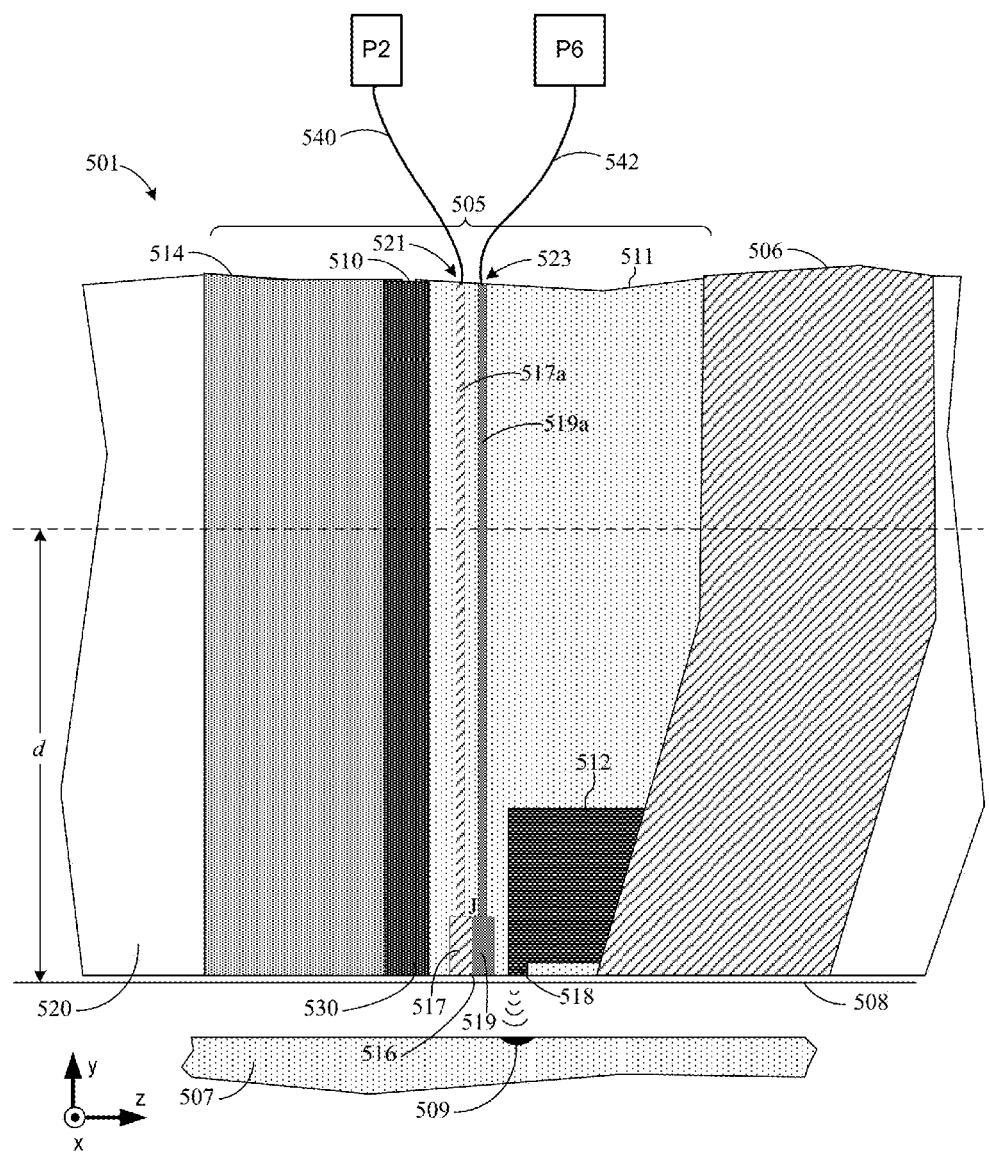
FIG. 6A shows a transparent thermocouple situated adjacent an NFT in accordance with various embodiments.

FIG. 6A shows a transparent thermocouple 516 situated adjacent an NFT 512 in accordance with various embodiments. The transparent thermocouple 516 shown in FIG. 6A includes a first element 517 formed from a first optically-transparent material and a second element 519 formed from a second optically-transparent material. The first and second materials are dissimilar optically-transparent conductive materials. For example, the first material can be a p-type material, and the second material can be an n-type material. Other types of first and second materials can be used that provide a difference in Seebeck coefficients. The first element 517 and the second element 519 form a junction, J, at or near the ABS 508 adjacent the peg 518 of the NFT 512. The junction, J, formed by the dissimilar first and second materials produces an electric potential related to the temperature at the NFT 512 (e.g., temperature adjacent the peg 518). As such, the junction, J, can be used as a thermometer to measure and monitor temperatures at the NFT 512. In some embodiments, the temperature measured by the transparent thermocouple 516 is a relative temperature. In other embodiments, the temperature measured by the transparent thermocouple 516 is an absolute temperature.

The first element 517 includes an elongated lead section 517a that extends in the y-direction away from the NFT 512. The second element 519 includes an elongated lead section 519a that extends in the y-direction away from the NFT 512. The lead section 517a is formed from the same material (first optically-transparent material) as the first element 517, and the lead section 519a is formed from the same material (second optically-transparent material) as the second element 519. At a location well away (in the y-direction) from the NFT 512, the lead section 517a is connected to a first conductor 540 at a first connection 521, and the lead section 519a is connected to a second conductor 542 at a second connection 523. The first conductor 540 is coupled to a first electrical bond pad (e.g., P2) of the slider body 501, and the second conductor 542 is coupled to a second electrical bond pad (e.g., P6). The first and second conductors 540 and 542 can be formed from copper, for example. The open circuit voltage of the thermocouple 516 can be measured as the potential between the two bond pads, P2 and P6.

The lead section/conductor connections 521, 523 are preferably located far enough away from the NFT 512 that these connections are not affected by the heat generated at the NFT 512. In some embodiments, the lead section/conductor connections 521, 523 are located at a location of the slider body 501 whose temperature is known, such as by use of another temperature sensor provided in or proximate the slider body 501. Use of another temperature sensor at or near the lead section/conductor connections 521, 523 allows for accurate measurement of the reference temperature at each of the lead section/conductor connections 521, 523, which effectively define ancillary junctions of the transparent thermal conductor 516. With the transparent thermocouple 516 properly calibrated, and with knowledge of the reference temperatures at the lead section/conductor connections 521, 523, the absolute temperature at the junction J can be determined using known techniques.

According to some embodiments, the first optically-transparent material of the first element 517 is indium tin oxide (ITO), and the second optically-transparent material of the second element 519 is indium oxide ($In_2O_3$). The Seebeck coefficient for the junction, J, is ~110 µV/K. According to other embodiments, the first optically-transparent material of the first element 517 is ITO, and the second optically-transparent material of the second element 519 is manganese-doped indium tin oxide (Mn:ITO). The Seebeck coefficient for the junction, J, formed from these materials is ~94 µV/K. According to further embodiments, the first optically-transparent material of the first element 517 is ITO, and the second optically-transparent material of the second element 519 is antimony-doped tin oxide (Sb:TO). The Seebeck coefficient for the junction, J, formed from these materials can range between about 7 and 77 µV/K. Each of the materials listed above is transparent to visible light and to the light wavelengths associated with heat-assisted magnetic recording (e.g., 700-1550 nm, such as 830 nm).

Other optically-transparent materials can be used to form the junction, J, of a transparent thermocouple incorporated in a slider, such as near the NFT. Such materials include the following: ZnO, aluminum-doped zinc oxide (Al:ZnO or AZO), aluminum and gallium co-doped ZnO ceramics (AGZO), Zn co-doped ITO, fluorine-doped tin oxide (FTO); reduced (oxygen deficient) single crystal $TiO_2$, indium gallium zinc oxide (IGZO), $SnO_2$, $TiO_2$, $Ga_2O_3$, $CuAlO_2$, $Cu_2O$, $HfO_2$, MgO, and $SiO_2$. These and other optically-transparent materials disclosed herein can be used in various combinations as materials used to form the junction, J, of the transparent thermocouple. Although any of the disclosed materials can be used together to form a transparent thermocouple, those that provide a greater difference in Seebeck coefficients can provide larger voltage signals. In some embodiments, and as discussed hereinbelow, a portion of the NFT is used as one of the materials that form the junction, J, while any of the optically-transparent materials disclosed herein can be used as the other material used to form the junction, J. In general, higher performing transparent thermocouples include those that combine p-type materials with n-type materials. Examples of various p-type materials include $NiCo_2O_4$, $CuAlO_2$, $CuGaO_2$, $CuInO_2$, $SrCu_2O_2$, and LaCuOCh (where Ch represents chalcogen). Examples of various n-type materials include AZO and ITO, among others listed above.

Figure 6B:
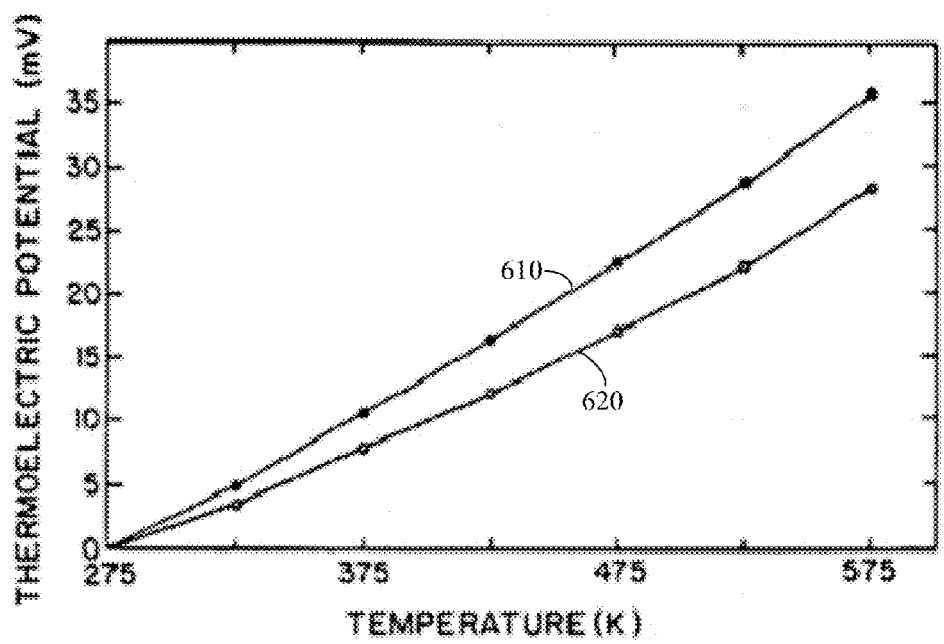
FIG. 6B is a graph of the thermoelectric response of two transparent thin film thermocouples which can be incorporated in a HAMR slider in accordance with various embodiments.

FIG. 6B is a graph of the thermoelectric response 610 and 620 of two $ITO/In_2O_3$ thin film thermocouples with room temperature resistances of 17 K ohms and 7.7 K ohms, respectively. The optical transmission of the thin films that produced thermoelectric responses 610 and 620 ranged from 80% at a wavelength of 450 nm to 94% at a wavelength of 700 nm for the ITO and 68%-83% at these wavelengths for the $In_2O_3$. Additional details of suitable thin film thermocouples for some embodiments are found in U.S. Pat. No. 4,969,956, which is incorporated herein by reference.

Figure 7:
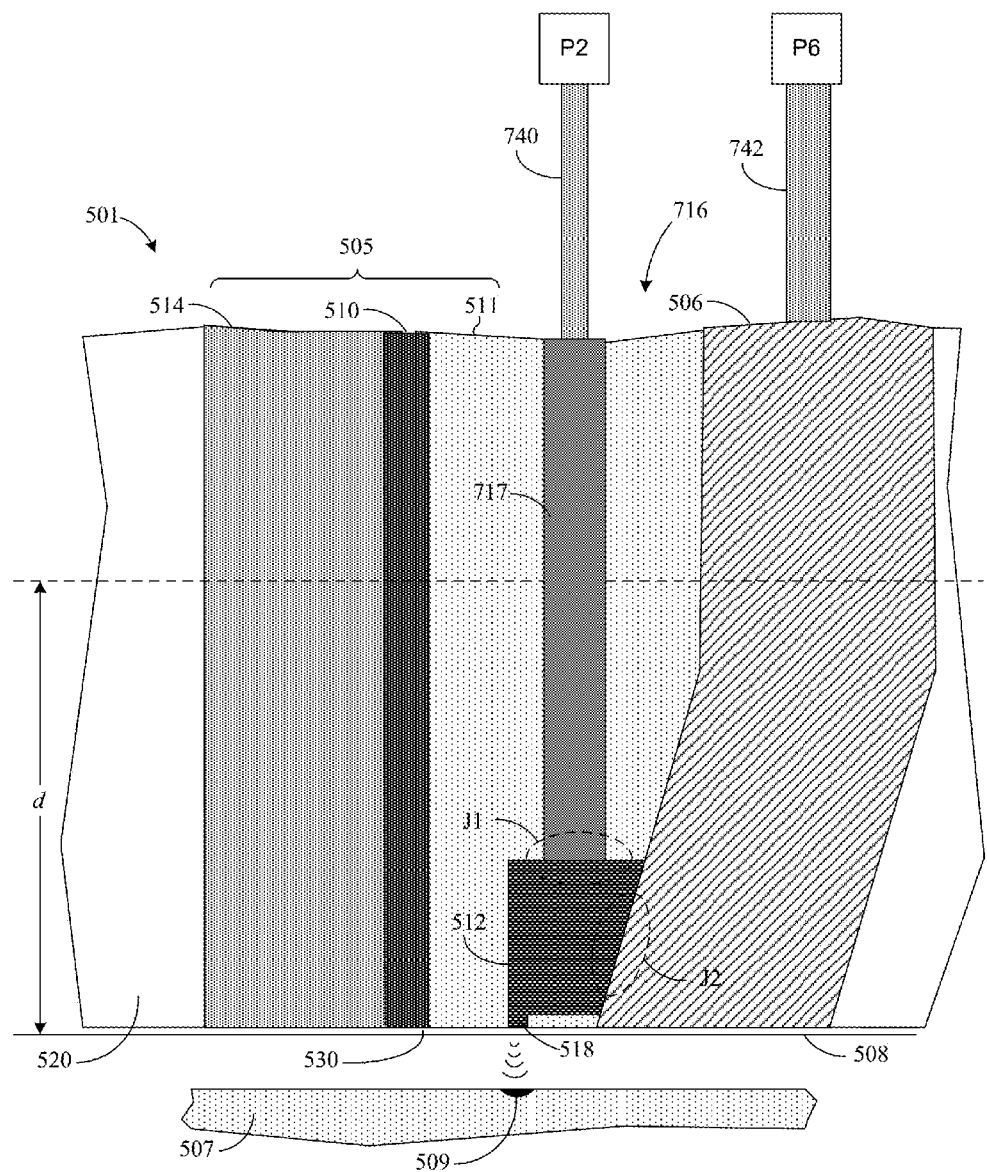
FIG. 7 shows a transparent thermocouple according to other embodiments implemented in the slider shown in FIG. 6A.

FIG. 7 shows a transparent thermocouple 716 according to other embodiments implemented in the slider body 501 shown in FIG. 6A. The transparent thermocouple 716 includes a first element 717 formed from a first optically-transparent material and a second element defined by the NFT 512. The location at which the first element 717 connects to the NFT 512 defines a junction, J1, of the transparent thermocouple 716. The embodiment of the transparent thermocouple 716 shown in FIG. 7 provides for highly localized sensing of NFT temperature, since one element of the transparent thermocouple 716 is the NFT 512 itself. As was discussed previously, the thermocouple 716 shown in FIG. 7 is considered to be "transparent" since the thermocouple 716 comprises a transparent first element and an existing component of the slider body 501 as the second element. As such, the transparent thermocouple 716 does not introduce a non-optically-transparent element into the slider body 501.

The first element 717 is formed from a first optically-transparent material, such as ITO, Mn:ITO, or Sb:TO. The NFT 512 can be formed from any plasmonic metal, such as Au, Ag, Cu, Al, Pt, Pd, and Rh, for example, or alloys of these metals. Each combination of these first and second materials can theoretically produce a sufficiently high Seebeck coefficient. A transparent thermocouple 716 comprising a first element 717 formed from Mn:ITO and the NFT 512 formed from Au, for example, can theoretically produce a very high Seebeck coefficient.

In the embodiment shown in FIG. 7, the first element 717 of the transparent thermocouple 716 extends from the junction, J1, at the NFT 512 to a location within the slider body 501 well away from the NFT 512 for reasons discussed previously. The first element 717 is coupled to a first electrical bond pad, P2, via a first conductor 740, which may be a copper conductor for example. The NFT 512 is electrically coupled to another electrical bond pad, P6, via the write pole 506 and a second conductor 742 (e.g., a copper conductor). The location of the connection between the write pole 506 and the second conductor 742 is well away from the NFT 512 reasons discussed previously. The connection between the NFT 512 and the write pole 506 defines a second junction, J2, of the transparent thermocouple 716.

A thermocouple with two junctions J1 and J2 will produce on open-circuit voltage that is the net sum of the voltages produced by a thermocouple with junction J1 and a thermocouple with junction J2. In some cases, depending on the polarity of the Seebeck coefficients of the materials comprising junctions J1 and J2, the net sum voltage of the thermocouple 716 will be lower than for a thermocouple comprising only junction J1 or only junction J2. In other cases, depending on the polarity of the Seebeck coefficients of the materials comprising junctions J1 and J2, the net sum of the thermocouple 716 voltage will be higher than for a thermocouple comprising only junction J1 or only junction J2. If the temperature at junction J1 is equivalent to the temperature at junction J2, the net thermocouple 716 will behave as if there is one junction of dissimilar materials between element 717 and write pole 506. For the embodiment shown in FIG. 7, it may be challenging to determine absolute temperature of the NFT 512 or NFT peg 518 without knowing the temperatures at junction J1 and junction J2, but the transparent thermocouple 716 would still function to measure relative temperature at the NFT 512, determine fly height and/or contact between the slider 501 and the recording medium 507 at a close point that includes the NFT 512, and monitor output optical power of the laser 220.

Figure 8:
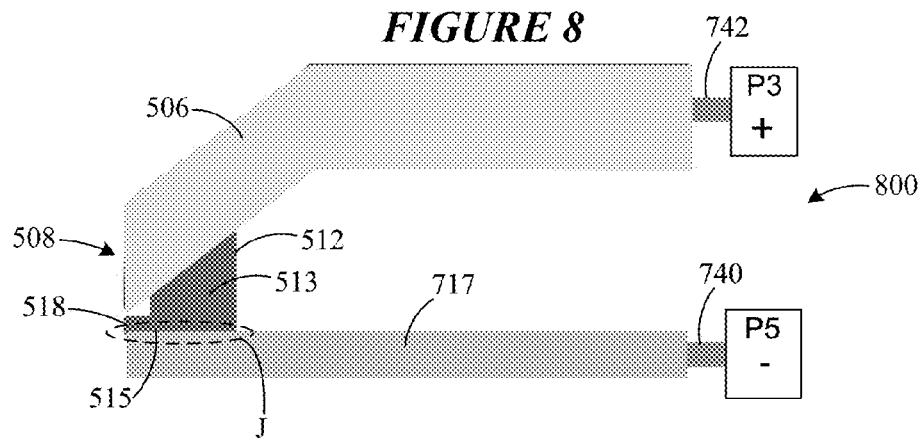
FIG. 8 illustrates a transparent thermocouple for use in a HAMR slider in accordance with various embodiments.

FIG. 8 illustrates a transparent thermocouple 800 for use in a HAMR slider in accordance with various embodiments. The transparent thermocouple 800 includes a junction, J, formed between a transparent element 717 and portions of the NFT 512 that include an enlarged region 513 (e.g., a heat sink integral or coupled to the NFT) and the peg 518. The junction, J, is considered the primary junction at which the desired temperature is to be measured, it being understood that the thermocouple 800 includes other junctions that are accounted for in the implementation of the thermocouple 800. In the embodiment shown in FIG. 8, the transparent element 717 is formed along a first surface 515 of the NFT 512 that includes the peg 518. The transparent element 717 can extend along the entirety of the first surface 515 of the NFT 512 and terminate at the ABS 508 (e.g., extend as far as the terminal end of the peg 518). The NFT 512 is coupled to a first electrical bond pad, P3, via a first conductor 742. The transparent element 717 is coupled to a second electrical bond pad, P5, via a second conductor 740. It is noted that the transparent element 717 can be formed from an optically-transparent material of a type previously described. An open circuit voltage can be measured as the potential between bond pads P3 and P5.

Figure 9:
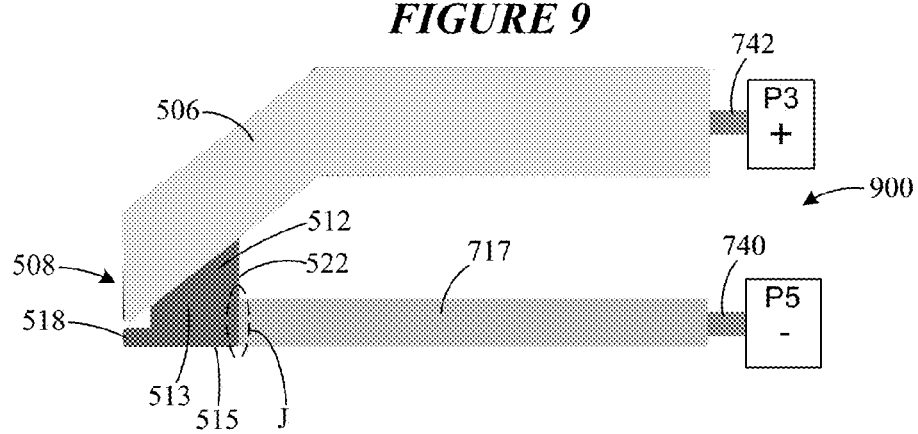
FIG. 9 illustrates a transparent thermocouple for use in a HAMR slider in accordance with various embodiments.

FIG. 9 illustrates a transparent thermocouple 900 for use in a HAMR slider in accordance with other embodiments. The transparent thermocouple 900 shown in FIG. 9 includes features similar to those shown in FIG. 8, but differs in terms of the location of the junction, J. The junction, J, in the embodiment shown in FIG. 9 is formed between a transparent element 717 and a rear surface 522 (opposing the media-facing surface) of the NFT 512. In the embodiment shown in FIG. 9, the transparent element 717 does not extend along the first surface 515 of the NFT 512. The transparent element 717 can be formed from an optically-transparent material of a type previously described. The NFT 512 is coupled to a first electrical bond pad, P3, via a first conductor 742, and the transparent element 717 is coupled to a second electrical bond pad, P5, via a second conductor 740. An open circuit voltage can be measured as the potential between bond pads P3 and P5.

Figure 10:
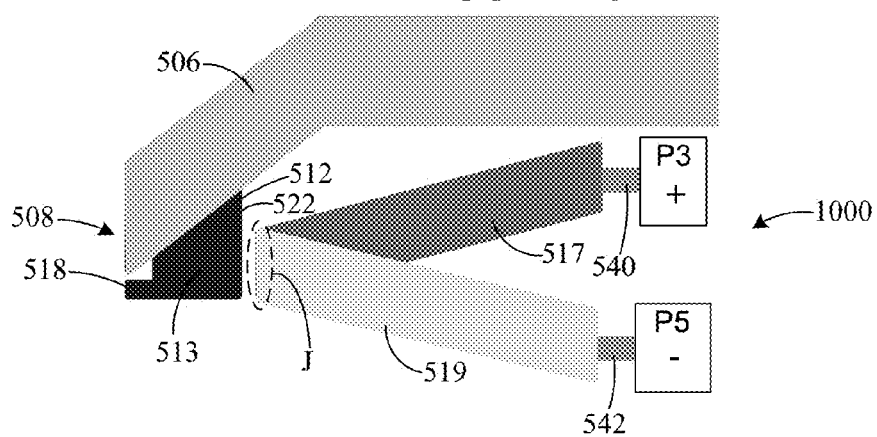
FIG. 10 illustrates a transparent thermocouple for use in a HAMR slider in accordance with various embodiments.

FIG. 10 illustrates a transparent thermocouple 1000 for use in a HAMR slider in accordance with other embodiments. In the transparent thermocouple 1000 shown in FIG. 10, a junction, J is formed between two dissimilar optically-transparent elements 517 and 519. The junction, J, is situated adjacent a rear surface 522 of an enlarged region 513 of the NFT 512. The two dissimilar elements 517 and 519 can be formed from optically-transparent materials previously described. A first transparent element 517 is coupled to a first electrical bond pad, P3, via a first conductor 540, and a second transparent element 519 is coupled to a second electrical bond pad, P5, via a second conductor 542. An open circuit voltage can be measured as the potential between bond pads P3 and P5.

Figure 11:
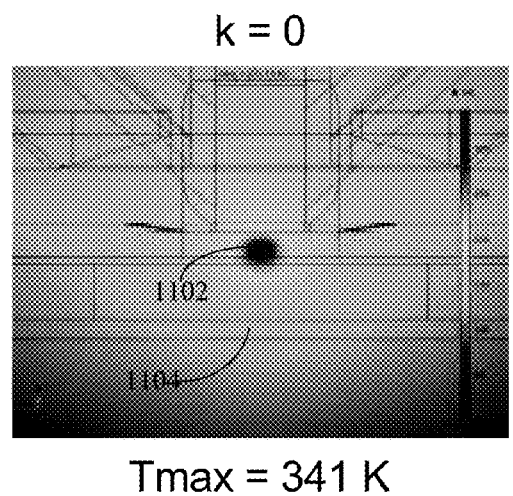
FIGS. 11-13 illustrate results of experimental modeling conducted to evaluate the efficacy of a transparent thermocouple situated proximate an NFT in accordance with various embodiments.
Figure 12:
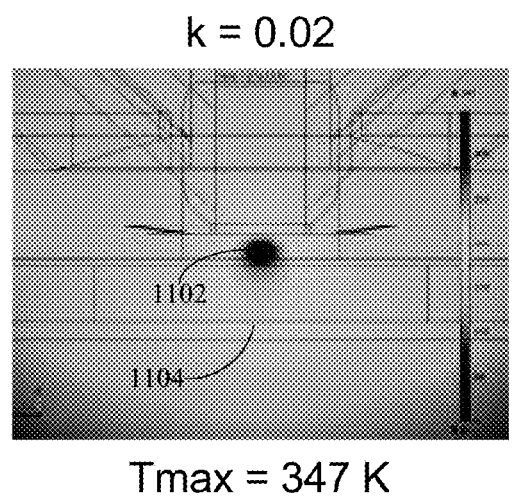
Figure 13:
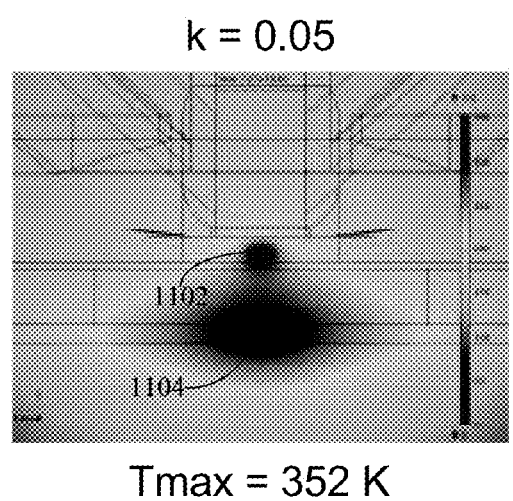

Experimental modeling was conducted to evaluate the efficacy of a transparent thermocouple situated proximate an NFT in accordance with various embodiments. Results of the modeling are illustrated in FIGS. 11-13. In each of FIGS. 11-13, the framework of a HAMR slider is shown with an NFT 1102 subject to plasmonic excitation in response to incident light having a wavelength of 830 nm. A transparent thermocouple 1104 is shown situated proximate the NFT 1102. The modeling evaluated the effect of different values of the extinction coefficient, k, of the transparent thermocouple 1104 on the optical performance of the NFT 1102. In general, extinction of radiant energy is caused by absorption and scattering. The extinction coefficient, k, is the sum of the absorption coefficient and the scattering coefficient, and generally depends on wavelength and temperature.

In FIG. 11, it can be seen that the transparent thermocouple 1104 with an extinction coefficient of k=0 has no effect on the performance of the NFT 1102. In the case of k=0, the thermocouple 1104 is completely optically transparent, and as such, does not absorb or scatter incident light impinging on the NFT 1102. The temperature of the NFT 1102 for the case where the transparent thermocouple has k=0 was 341 K.

In FIG. 12, the extinction coefficient, k, of the transparent thermocouple 1104 was set to 0.02. At this value of k, the transparent thermocouple 1104 absorbs and/or scatters a negligible amount of incident light impinging on the NFT 1102. At an extinction coefficient of k=0.02, the temperature of the NFT 1102 increases from 341 K to 347 K, which corresponds to a 1.8% increase. It was determined that a transparent thermocouple 1104 having an extinction coefficient, k, of 0.02 negligibly (acceptably) impacts the performance of the NFT 1102.

In FIG. 13, the extinction coefficient, k, of the transparent thermocouple 1104 was set to 0.05. At this value of k, the transparent thermocouple 1104 absorbs and/or scatters an appreciable amount of incident light impinging on the NFT 1102. At an extinction coefficient of k=0.05, the temperature of the NFT 1102 increases from 341 K to 352 K, which corresponds to 3.2% increase. It was determined that a transparent thermocouple 1104 having an extinction coefficient, k, of 0.05 adversely impacts the performance of the NFT 1102.

The experimental modeling results revealed that transparent thermocouples having an extinction coefficient, k, of up to 0.02 have a negligible or acceptable impact on the performance of the NFT. Transparent thermocouples having an extinction coefficient, k, of 0.05 or greater have an adverse or unacceptable impact on the performance of the NFT. In some implementations, a transparent thermocouple having an extinction coefficient, k, of up to 0.03 may have an acceptable impact on the optical performance of the NFT.

Various embodiments of the disclosure are directed to a slider that incorporates a set of bond pads coupled to bias sources and a multiplicity of electrical components coupled to the bond pad set, wherein at least one of the bond pads is shared between at least one of the electrical components and a transparent thermocouple. An issue with adding additional components or any electrical feature in general to an existing slider or head gimbal assembly (HGA) is the real estate required to place bond pads which allow access to these new features. Some slider form factors, for example, can accommodate nine bond pads. In other sliders, a total of ten bond pads is likely feasible. Any increase in bond pad count above nine or ten (depending on the slider/HGA design) likely requires migration to a top bond pad configuration, which is both more technically challenging and expensive. An alternative to adding an additional bond pad above the designed-in pad count is for the transparent thermocouple to share an existing bond pad with at least one other electrical device on the slider.

Figure 14:
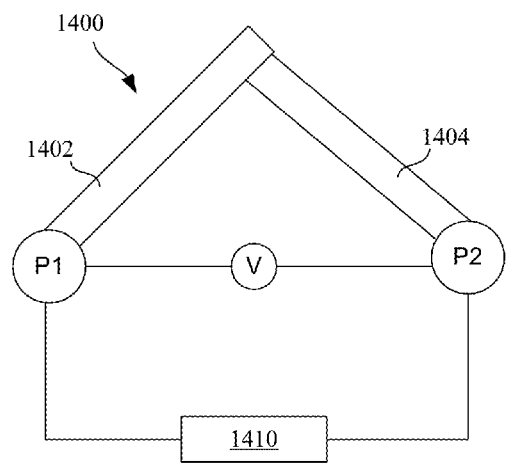
FIG. 14 shows bond pad sharing between a transparent thermocouple and another electrical device of the slider in accordance with various embodiments.

According to some embodiments, and with reference to FIG. 14, a transparent thermocouple 1400 includes a first transparent element 1402 coupled to a first bond pad, P1, and a second transparent element 1404 coupled to a second bond pad, P2. Another electrical device, 1410, is also coupled to bond pads P1 and P2 in parallel with the transparent thermocouple 1400. In some embodiments, the electrical device 1410 is a reader.

In general, the temperature thermocouple 1400 is operated during write operations and inactive during read operations. Conversely, the reader 1410 is active during read operations and inactive during write operations. Because the transparent thermocouple 1400 and the reader 1410 can be operated alternately, these two devices can be configured to share bond pads P1 and P2. During write operations, for example, an open circuit voltage, V, of the transparent thermocouple 1400 can be measured as the potential between bond pads P1 and P2. As was discussed previously, the transparent thermocouple 1400 can be used for one or more of measuring relative or absolute temperature near or at the NFT, determining fly height and/or contact between the slider and a recording medium at a close point that includes the NFT, and monitoring output optical power of the laser.

Figure 15:
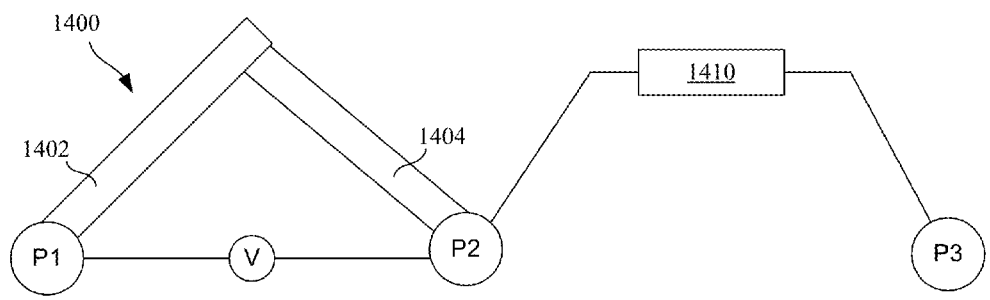
FIG. 15 shows bond pad sharing between a transparent thermocouple and another electrical device of the slider in accordance with various embodiments.

FIG. 15 shows another embodiment of bond pad sharing between a transparent thermocouple and another device of the slider in accordance with various embodiments. More particularly, the transparent thermocouple 1400 shares a common bond pad, P2, with another device 1410 of the slider. The first transparent element 1402 of the thermocouple 1400 is coupled to a first bond pad, P1, and the second transparent element 1404 is coupled to a second bond pads, P2. The device 1410 is coupled to the second bond pad, P2 and to a third bond pad, P3. In some embodiments, the device 1410 can be a reader. In other embodiments, the second device 1410 can be a contact sensor configured to sense asperities of the recording medium.

Figure 16:
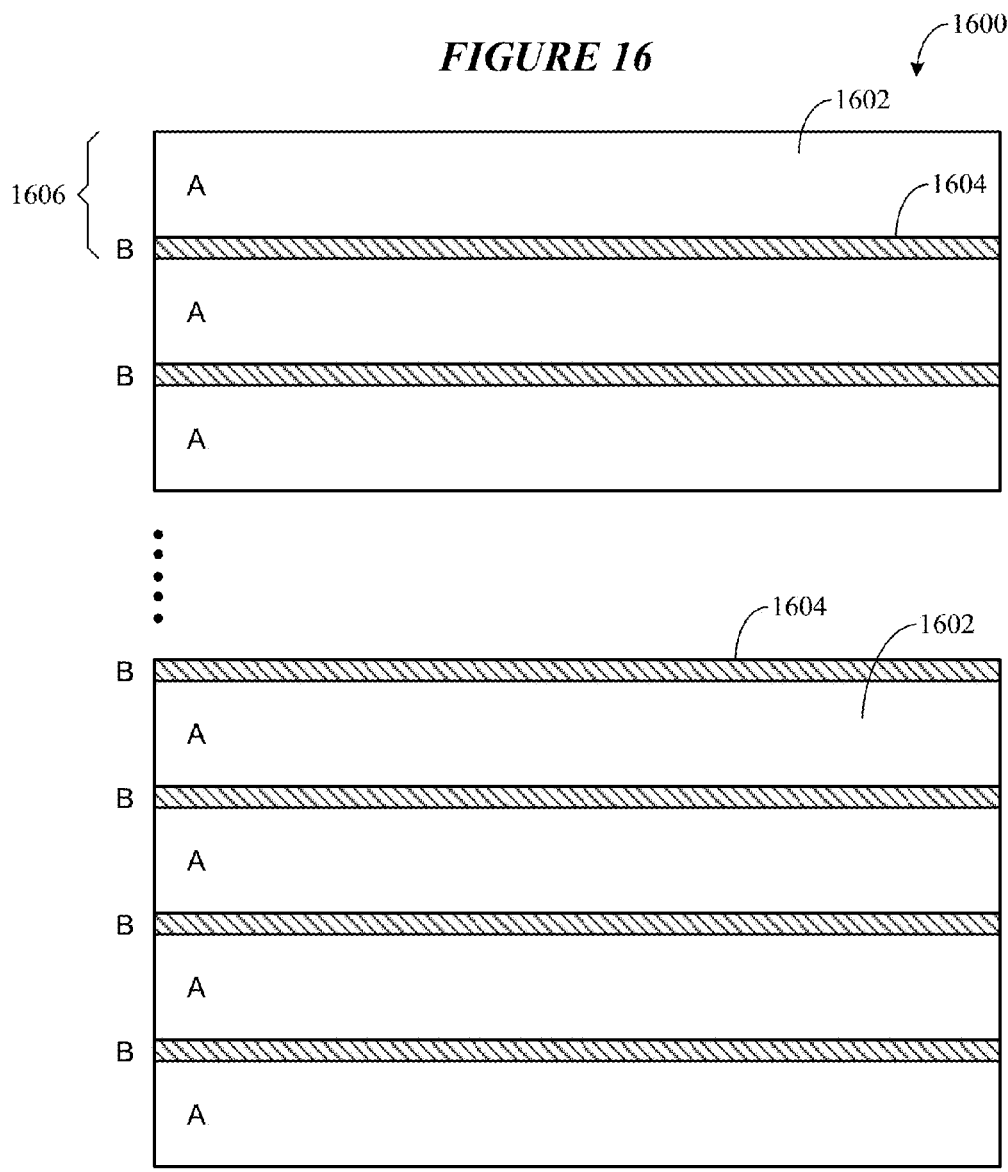
FIG. 16 illustrates a transparent element of a transparent thermocouple which has a multilayered structure in accordance with various embodiments.

According to some embodiments, a transparent thermocouple for use in a HAMR slider can have a multilayered structure. FIG. 16 illustrates a transparent element 1600 of a transparent thermocouple which has a multilayered structure. The transparent element 1600 is fabricated to include alternating first and second layers 1602 and 1604. As shown, the first layers 1602 comprise material A, and the second layers 1604 comprise material B. The combination of a first layer 1602 and an adjacent second layer 1604 is referred to herein as a transparent thermoelectric unit 1606. The transparent element 1600 comprises a multiplicity of transparent thermoelectric units 1606, as is depicted in FIG. 16. In general, the transparent element 1600 includes between about 2 and 30 transparent thermoelectric units 1606. According to various embodiments, the transparent element 1600 includes >5 transparent thermoelectric units 1606. In other embodiments, the transparent element 1600 includes 10 or more transparent thermoelectric units 1606. In further embodiments, the transparent element 1600 includes 20 or more transparent thermoelectric units 1606.

The material A of the first layer 1602 is a transparent thermoelectric material that shows a strong Seebeck effect (e.g., >~150 μV/K, such as >~200 μV/K, >~250 μV/K, or >~300 μV/K). The material B of the second layer 1604 is a material that confines electrons (e.g., 2D electron confinement) in the transparent thermoelectric material of the first layer 1602. The material B of the second layer 1604 serves to form 2D electron gas in material A of the first layer 1602. In some embodiments, material B of the second layer 1604 has a larger electronic bandgap than material A of the first layer 1602. In other embodiments, material B has a much lower carrier concentration than material A. In further embodiments, material B has a larger electronic bandgap than material A and a much lower carrier concentration than material A.

According to various embodiments, the first layer 1602 comprises one of indium tin oxide (ITO), indium oxide, manganese-doped indium tin oxide, antimony tin oxide, ZnO, aluminum-doped zinc oxide (AZO), an aluminum and gallium co-doped ZnO ceramic (AGZO), Zn co-doped ITO, fluorine-doped tin oxide (FTO), reduced single crystal $TiO_2$, indium gallium zinc oxide (IGZO), $SnO_2$, $TiO_2$, $Ga_2O_3$, $CuAlO_2$, $Cu_2O$, $HfO_2$, MgO, $SiO_2$, $NiCo_2O_4$, $CuAlO_2$, $CuGaO_2$, $CuInO_2$, $SrCu_2O_2$, and LaCuOCh. The second layer 1604 comprises any of the materials of the first layer listed above and one of bismuth titanante ($Bi_4Ti_3O_{12}$), niobium oxide ($Nb_2O_5$), and tantalum oxide ($Ta_2O_5$). According to various embodiments, the first layer 1602 can have a thickness of between about 10 and 100 Å. The second layer 1604 can have a thickness of between about 1 and 20 Å. It is understood that materials A and B and the thickness of these material layers can be adjusted as needed or desired.

Figure 17:
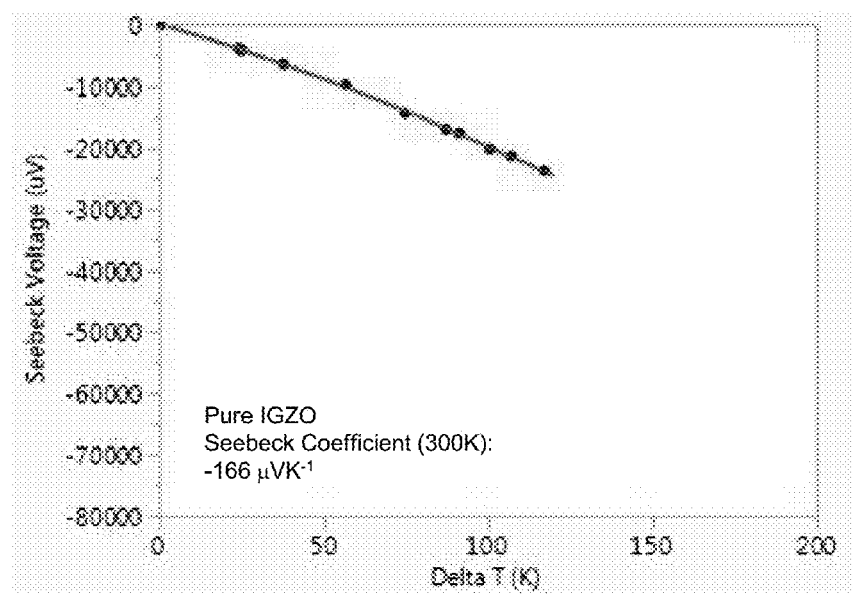
FIG. 17 shows a plot of Seebeck voltage vs. Temperature for a partially transparent single-layered thermocouple when using gold as the junction metal.
Figure 18:
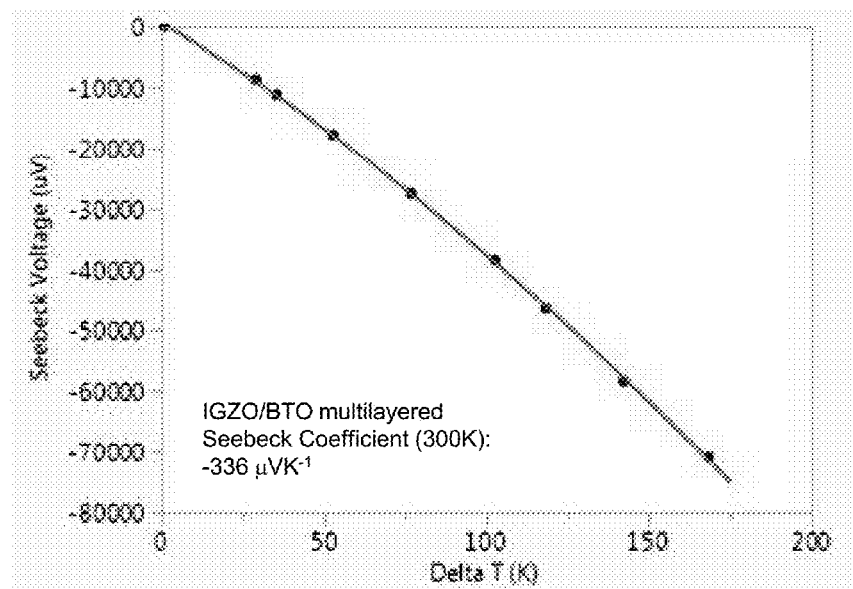
FIG. 18 shows a plot of Seebeck voltage vs. Temperature for a transparent thermocouple having a multilayered structure comprising alternating first layers and second layers in accordance with various embodiments.

FIG. 17 shows a plot of Seebeck voltage vs. Temperature for a partially transparent single-layered indium gallium zinc oxide (IGZO) film when using gold as the junction metal. FIG. 18 shows the result of the same measurement of a transparent thermocouple having a multilayered structure comprising alternating first layers (material A) and second layers (material B) in accordance with various embodiments. The measurements shown in FIG. 18 were obtained from a multilayered transparent thermocouple comprising IGZO as material A of the first layers and $Bi_4Ti_3O_{12}$ (BTO) as material B of the second layers. The first layer of material A in each transparent thermoelectric unit had a thickness of 45 Å, and the second layer of material B in each transparent thermoelectric unit had a thickness of 5 Å. The multilayered transparent thermocouple included 20 repeating transparent thermoelectric units.

When comparing the measurements of FIG. 18 with those of FIG. 17, it can be seen that the Seebeck coefficient is doubled and the absolute value exceeds 300 $mK^{-1}$ by introducing the multilayered IGZO/BTO structure into the transparent thermocouple (336 $mK^{-1}$ Seebeck coefficient (300K)). It is noted that the curves shown in FIGS. 17 and 18 were generated using a polynomial fit (degree=2) of the measured data. The enhancement of the Seebeck coefficient is attributed to fact that BTO confines the conducting electrons of IGZO within each ultrathin layer and forms 2D electron gas.

Figure 19:
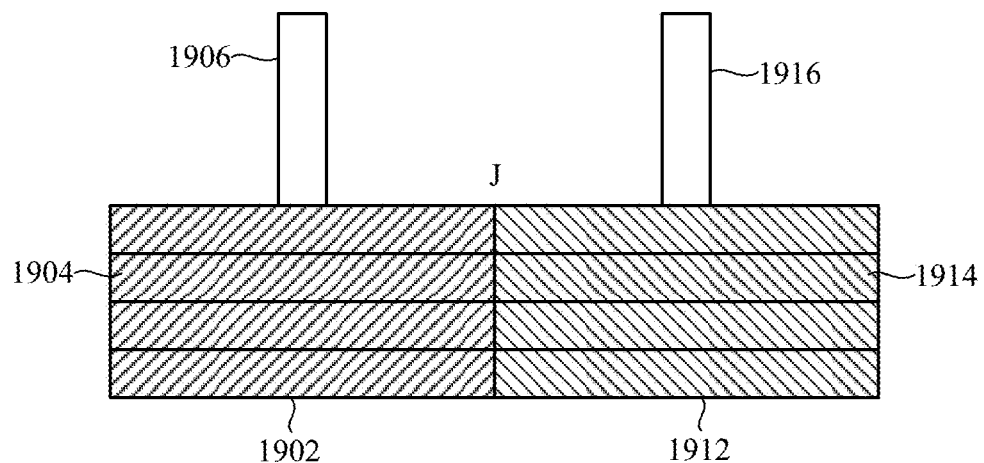
FIG. 19 illustrates a multilayered transparent thermocouple for use in a HAMR slider in accordance with various embodiments.

FIG. 19 illustrates a transparent thermocouple for use in a HAMR slider in accordance with various embodiments. The transparent thermocouple shown in FIG. 19 includes a first transparent element 1902, a second transparent element 1912, and a junction J formed between the first and second elements 1902 and 1912. The first transparent element 1902 includes a multiplicity of thermoelectric units 1904 (e.g., >5 units). The second transparent element 1912 includes a multiplicity of thermoelectric units 1914 (e.g., >5 units). The materials (A and B) used to construct the first and second transparent elements 1902 and 1904 can be any of those disclosed hereinabove which, when combined to form the junction J, produce a high Seebeck effect. For example, the first and second transparent elements 1902 and 1912 comprise transparent semiconductor materials (e.g., those listed hereinabove) with opposite signs of Seebeck coefficient (one positive, the other negative, such as one n-type and the other p-type semiconductor material). The first transparent element 1902 is electrically coupled to a first lead 1906, and the second transparent element 1912 is electrically coupled to a second lead 1916. The first and second leads 1902 and 1916 can be formed from a metal or metal alloy, such as Au, Pd, or their alloys.

Figure 20:
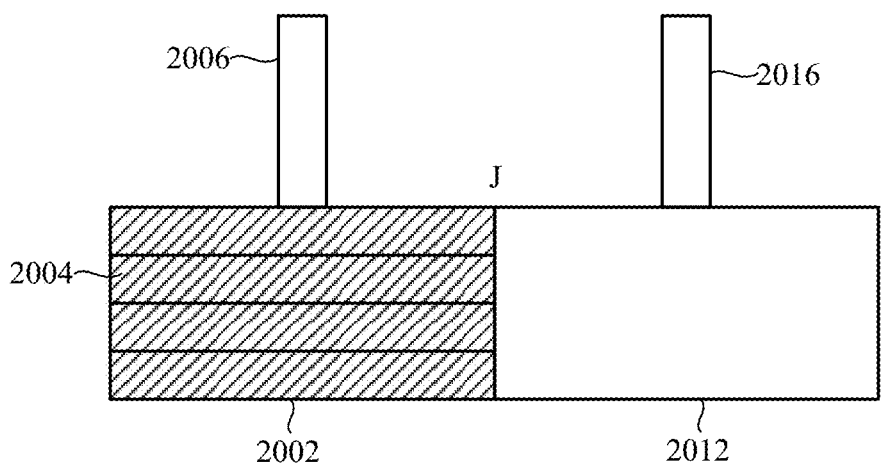
FIG. 20 illustrates a multilayered transparent thermocouple for use in a HAMR slider in accordance with other embodiments.

FIG. 20 illustrates a transparent thermocouple for use in a HAMR slider in accordance with other embodiments. The transparent thermocouple shown in FIG. 20 includes a first transparent element 2002, a second transparent element 2012, and a junction J formed between the first and second elements 2002 and 2012. The first transparent element 2002 includes a multiplicity of thermoelectric units 2004 (e.g., >5 units). The materials (A and B) used to construct the first transparent element 2002 can be any of those disclosed hereinabove. The second transparent element 2012 is formed as a single-layered film using one of the materials listed hereinabove. The materials used to construct the multilayered first transparent element 2002 and the single-layered film of the second transparent element 2012, when combined to form the junction J, produce a high Seebeck effect.

Figure 21:
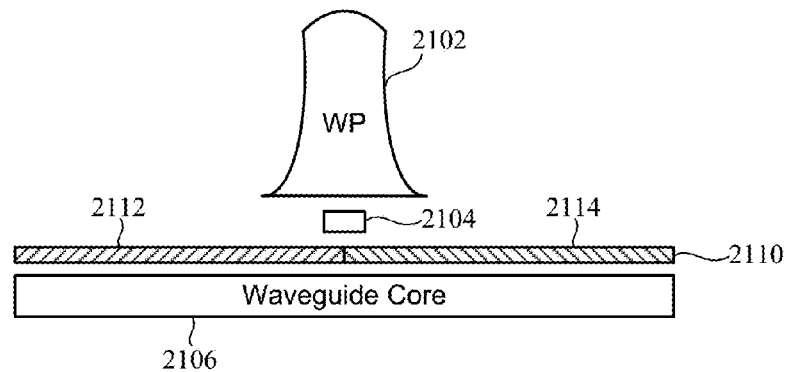
FIG. 21 illustrates a writer region of a HAMR slider which incorporates a multilayered transparent thermocouple in accordance with various embodiments.
Figure 22:
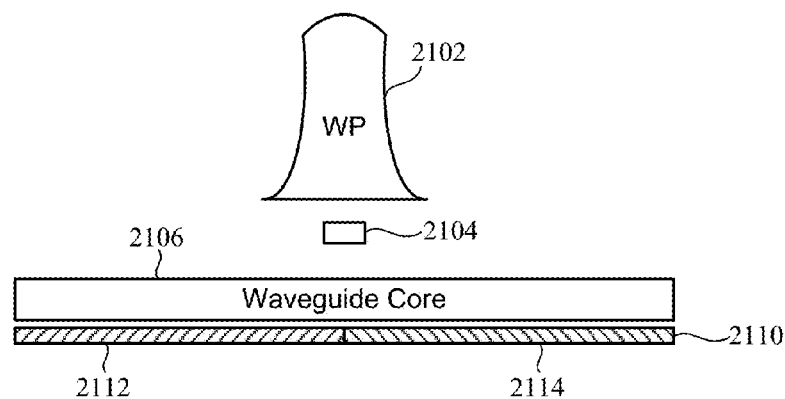
FIG. 22 illustrates a writer region of a HAMR slider which incorporates a multilayered transparent thermocouple in accordance with various embodiments.

FIGS. 21 and 22 illustrate a writer region of a HAMR slider which incorporates a transparent thermocouple in accordance with various embodiments. In FIGS. 21 and 22, the writer region includes a write pole 2102, an NFT 2104 adjacent to the write pole 2102, and a waveguide core adjacent to the NFT 2104. In FIG. 21, the transparent thermocouple 2110 is situated between the waveguide core 2106 and the NFT 2104 (e.g., in the core-NFT space), such that the thermocouple 2110 is immediately adjacent to the NFT 2104. In this configuration, no optical or electrical component is situated between the thermocouple 2110 and the NFT 2104. The positioning of the transparent thermocouple 2110 shown in FIG. 21 provides accurate local contact detection and excellent in situ temperature measurements of the NFT 2104.

In FIG. 22, the transparent thermocouple 2110 is situated immediately adjacent to the waveguide core 2106, with the waveguide core 2106 positioned between the NFT 2104 and the thermocouple 2110. In this configuration, no optical or electrical component is situated between the thermocouple 2110 and the waveguide core 2106. The positioning of the transparent thermocouple 2110 shown in FIG. 22 provides accurate local contact detection and good in situ temperature measurements of the NFT 2104.

The transparent thermocouple 2110 shown in FIGS. 21 and 22 can have a construction the same as or similar to the thermocouples shown in FIGS. 16 and 19-20. The materials A and B of the thermoelectric units 1904, 1914, and 2004 can be deposited using vacuum deposition methods like, but not limited to, magnetron sputtering, atomic layer deposition, chemical vapor deposition, and solution coating, for example.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider configured for heat-assisted magnetic recording;
   a near-field transducer (NFT) at the slider; and
   a transparent thermocouple at the slider and situated adjacent the NFT, the transparent thermocouple configured to produce a signal indicative of temperature at the NFT and having an extinction coefficient equal to or less than a predetermined value so as to have no or only a negligible impact on performance of the NFT.

2. The apparatus of claim 1, wherein the thermocouple is adjacent the NFT or adjacent an optical waveguide of the slider coupled to the NFT.

3. The apparatus of claim 1, wherein the thermocouple comprises a junction formed between a first element and the NFT.

4. The apparatus of claim 1, wherein the thermocouple comprises a junction formed between a first element comprising indium tin oxide and a second element comprising one of indium oxide, manganese-doped indium tin oxide, and antimony tin oxide.

5. The apparatus of claim 1, wherein the thermocouple comprises a junction formed between a first element and a second element, the first element or the second element comprising one of indium tin oxide (ITO), indium oxide, manganese-doped indium tin oxide, antimony tin oxide, ZnO, aluminum-doped zinc oxide (AZO), an aluminum and gallium co-doped ZnO ceramic (AGZO), Zn co-doped ITO, fluorine-doped tin oxide (FTO), reduced single crystal $TiO_2$, indium gallium zinc oxide (IGZO), $SnO_2$, $TiO_2$, $Ga_2O_3$, $CuAlO_2$, $Cu_2O$, $HfO_2$, MgO, $SiO_2$, $NiCo_2O_4$, $CuAlO_2$, $CuGaO_2$, $CuInO_2$, $SrCu_2O_2$, and LaCuOCh.

6. The apparatus of claim 1, wherein the thermocouple is configured to produce a signal indicative of one or both of spacing and contact between the slider and a magnetic recording medium.

7. The apparatus of claim 1, wherein the thermocouple is situated at an air bearing surface of the slider.

8. The apparatus of claim 1, wherein the thermocouple is situated away from an air bearing surface of the slider by a distance of up to about 1.5 μm.

9. The apparatus of claim 1, wherein the thermocouple is configured to produce a signal indicative of an absolute temperature at or proximate the NFT.

10. The apparatus of claim 1, wherein:
the slider comprises a plurality of electrical bond pads; and
the thermocouple is coupled to a pair of the bond pads in parallel with another electrical component of the slider.

11. The apparatus of claim 1, wherein:
the thermocouple comprises a junction formed between a first element and a second element; and
at least one of the first and second elements comprises a plurality of alternating first and second layers, the first layers comprising transparent thermoelectric material and the second layers comprising material that confines electrons in the transparent thermoelectric material of the first layers.

12. The apparatus of claim 11, wherein:
the first layer comprises one of indium tin oxide (ITO), indium oxide, manganese-doped indium tin oxide, antimony tin oxide, ZnO, aluminum-doped zinc oxide (AZO), an aluminum and gallium co-doped ZnO ceramic (AGZO), Zn co-doped ITO, fluorine-doped tin oxide (FTO), reduced single crystal $TiO_2$, indium gallium zinc oxide (IGZO), $SnO_2$, $TiO_2$, $Ga_2O_3$, $CuAlO_2$, $Cu_2O$, $HfO_2$, MgO, $SiO_2$, $NiCo_2O_4$, $CuAlO_2$, $CuGaO_2$, $CuInO_2$, $SrCu_2O_2$, and LaCuOCh; and
the second layer comprises any of the materials of the first layer and one of bismuth titanante ($Bi_4Ti_3O_{12}$), niobium oxide ($Nb_2O_5$), and tantalum oxide ($Ta_2O_5$).

13. The apparatus of claim 1, wherein:
the thermocouple comprises a junction formed between a first element and a second element; and
each of the first and second elements comprises a plurality of alternating first and second layers, the first layers comprising transparent thermoelectric material and the second layers comprising material that confines electrons in the transparent thermoelectric material of the first layers.

14. An apparatus, comprising:
a slider configured for heat-assisted magnetic recording;
a near-field transducer (NFT) at the slider;
a transparent thermocouple at the slider and situated adjacent the NFT, the transparent thermocouple configured to produce a signal indicative of temperature at the NFT and having an extinction coefficient equal to or less than a predetermined value so as to have no or only a negligible impact on performance of the NFT; and
a detector coupled to the thermocouple, the detector configured to detect one or both of spacing changes and contact between the slider and a magnetic recording medium using a signal produced by the transparent thermocouple.

15. The apparatus of claim 14, wherein the thermocouple is adjacent the NFT or an optical waveguide coupled to the NFT.

16. The apparatus of claim 14, wherein the thermocouple comprises a junction formed between a first element and the NFT.

17. The apparatus of claim 14, wherein the thermocouple comprises a junction formed between a first element comprising indium tin oxide and a second element comprising one of indium oxide, manganese-doped indium tin oxide, and antimony tin oxide.

18. The apparatus of claim 14, wherein the thermocouple comprises a junction formed between a first element and a second element, the first element or the second element comprising one of indium tin oxide (ITO), indium oxide, manganese-doped indium tin oxide, antimony tin oxide, ZnO, aluminum-doped zinc oxide (AZO), an aluminum and gallium co-doped ZnO ceramic (AGZO), Zn co-doped ITO, fluorine-doped tin oxide (FTO), reduced single crystal $TiO_2$, indium gallium zinc oxide (IGZO), $SnO_2$, $TiO_2$, $Ga_2O_3$, $CuAlO_2$, $Cu_2O$, $HfO_2$, MgO, $SiO_2$, $NiCo_2O_4$, $CuAlO_2$, $CuGaO_2$, $CuInO_2$, $SrCu_2O_2$, and LaCuOCh.

19. The apparatus of claim 14, wherein:
the thermocouple comprises a junction formed between a first element and a second element; and
at least one of the first and second elements comprises a plurality of alternating first and second layers, the first layers comprising transparent thermoelectric material and the second layers comprising material that confines electrons in the transparent thermoelectric material of the first layers.

20. The apparatus of claim 19, wherein:
the first layers comprise one of indium tin oxide (ITO), indium oxide, manganese-doped indium tin oxide, antimony tin oxide, ZnO, aluminum-doped zinc oxide (AZO), an aluminum and gallium co-doped ZnO ceramic (AGZO), Zn co-doped ITO, fluorine-doped tin oxide (FTO), reduced single crystal $TiO_2$, indium gallium zinc oxide (IGZO), $SnO_2$, $TiO_2$, $Ga_2O_3$, $CuAlO_2$, $Cu_2O$, $HfO_2$, MgO, $SiO_2$, $NiCo_2O_4$, $CuAlO_2$, $CuGaO_2$, $CuInO_2$, $SrCu_2O_2$, and LaCuOCh; and
the second layers comprise any of the materials of the first layer and one of bismuth titanante ($Bi_4Ti_3O_{12}$), niobium oxide ($Nb_2O_5$), and tantalum oxide ($Ta_2O_5$).

21. The apparatus of claim 1, wherein the predetermined value is 0.03.

22. The apparatus of claim 14, wherein the predetermined value is 0.03.

* * * * *